United States Patent
Kulkarni et al.

(10) Patent No.: US 11,283,096 B2
(45) Date of Patent: Mar. 22, 2022

(54) FABRICATION PROCESS FOR MAKING ELECTROCHEMICAL MULTILAYER MEMBRANE MATERTALS

(71) Applicant: Arborsense, Inc., Ann Arbor, MI (US)

(72) Inventors: Girish Kulkarni, Ann Arbor, MI (US); Donald Kahaian, Farmington, MI (US)

(73) Assignee: Arborsense, Inc., Ann Arbor, MI (US)

( * ) Notice: Subject to any disclaimer, the term of this patent is extended or adjusted under 35 U.S.C. 154(b) by 414 days.

(21) Appl. No.: 16/419,290

(22) Filed: May 22, 2019

(65) Prior Publication Data

US 2020/0373598 A1    Nov. 26, 2020

(51) Int. Cl.
  *H01M 8/102* (2016.01)
  *H01M 8/1069* (2016.01)
  (Continued)

(52) U.S. Cl.
  CPC .............. *H01M 8/102* (2013.01); *B29C 65/02* (2013.01); *G01N 27/333* (2013.01);
  (Continued)

(58) Field of Classification Search
  CPC .. H01M 8/102; H01M 8/1048; H01M 8/1069; B29C 65/02; B29C 65/18; B29C 65/44; B29C 66/73141; B29C 66/73183; B29C 66/74; B29C 66/7444; B29C 66/8122; B29C 66/83221; G01N 27/333;
  (Continued)

(56) References Cited

U.S. PATENT DOCUMENTS

| 5,879,828 A | 3/1999 | Debe et al. |
| 9,048,471 B2 | 6/2015 | Yeung et al. |

(Continued)

FOREIGN PATENT DOCUMENTS

GB    2521193 A  *  6/2015  .........  G01N 27/4141

OTHER PUBLICATIONS

International Search Report; US Patent and Trademark Office; International Application No. PCT/US2020/033981; dated Oct. 7, 2020; 4 pages.

(Continued)

*Primary Examiner* — Philip C Tucker
*Assistant Examiner* — Brian R Slawski
(74) *Attorney, Agent, or Firm* — Taft Stettinius & Hollister LLP

(57) ABSTRACT

A method for fabricating an electrochemical sensor material includes positioning sheets of molded graphene nanoplatelets on each side of a proton exchange membrane and integrating graphene nanoplatelets into regions of the proton exchange membrane adjacent its surfaces by applying heat to increase the temperature of the proton exchange membrane to its glass transition temperature and applying compressive pressure to press a portion of each sheet of molded graphene nanoplatelets into the softened polymeric material of the proton exchange membrane. Following application of heat and pressure, the proton exchange membrane is cooled and excess graphene material is exfoliated. Electrochemical sensor components are cut from the material and electrochemical devices and systems are constructed therefrom.

34 Claims, 3 Drawing Sheets

(51) Int. Cl.
*H01M 8/1048* (2016.01)
*G01N 27/333* (2006.01)
*B29C 65/02* (2006.01)
*B29C 65/00* (2006.01)

(52) U.S. Cl.
CPC ....... *H01M 8/1048* (2013.01); *H01M 8/1069* (2013.01); *B29C 66/73141* (2013.01); *B29C 66/73183* (2013.01); *B29C 66/7444* (2013.01); *B29C 66/8122* (2013.01); *B29C 66/83221* (2013.01); *B32B 2255/20* (2013.01); *B32B 2264/10* (2013.01)

(58) Field of Classification Search
CPC ..... Y02E 60/50; Y02P 70/50; B32B 2255/20; B32B 2264/10
USPC ......... 156/60, 228, 247, 250, 267, 276, 278, 156/279, 297, 298, 308.2, 309.6, 701, 156/714; 429/482, 483, 492, 493, 494; 428/323, 402
See application file for complete search history.

(56) References Cited

U.S. PATENT DOCUMENTS

| | | | |
|---|---|---|---|
| 9,379,393 | B2 | 6/2016 | Jang et al. |
| 9,816,959 | B2 | 11/2017 | Umasankar et al. |
| 9,966,611 | B2 | 5/2018 | Sivarajan |
| 2013/0065154 | A1* | 3/2013 | Lee .................... H01M 8/1053 429/465 |
| 2016/0028097 | A1 | 1/2016 | Jiang et al. |
| 2016/0036081 | A1 | 2/2016 | Moghaddam et al. |
| 2016/0146751 | A1 | 5/2016 | Nemes |
| 2016/0359183 | A1 | 12/2016 | Rafailovich et al. |
| 2018/0108919 | A1* | 4/2018 | Lu ....................... H01M 8/1004 |
| 2019/0044169 | A1 | 2/2019 | Staser et al. |
| 2019/0051922 | A1 | 2/2019 | Noda et al. |
| 2020/0200699 | A1 | 6/2020 | Kulkarni et al. |

OTHER PUBLICATIONS

Written Opinion of the International Searching Authority; US Patent and Trademark Office; International Application No. PCT/US2020/033981; dated Oct. 7, 2020; 6 pages.

* cited by examiner

FABRICATION PROCESS FOR MAKING ELECTROCHEMICAL MULTILAYER MEMBRANE MATERTALS

STATEMENT REGARDING FEDERALLY SPONSORED RESEARCH

This invention was made with government support under Contract No. 2R44AA026119-02 awarded by the National Institutes of Health, an agency of the Department of Health and Human Services. The government has certain rights in the invention.

BACKGROUND OF THE DISCLOSURE

The present disclosure generally relates to novel methods for fabricating multilayer membrane materials such as those used to make components for ion exchange membrane sensors. More particularly, the disclosure relates to methods for fabricating thin multilayer sensor materials that can be used to reliably produce high quality sensors. The statements in this section provide background information related to the present disclosure and should not be construed as constituting prior art.

Electrochemical sensors are devices that have several advantageous characteristics that make them useful for chemical and biological detection, including, for example, that they can be constructed to be highly selective for certain target molecules, they can be operated with relatively small amounts of power, and recent developments have enabled production of devices having improved sensitivity. Electrochemical sensors generally include a sensing material that reacts with, or catalyzes a reaction of, a molecule of interest (e.g., analyte) in a manner that produces an electrical charge. By setting up a circuit and measuring this charge, the presence of the analyte can be determined and the concentration of the analyte can be measured. Such chemical sensing has a wide array of applications, including, for example, in environmental monitoring, biochemical defense and warfare, healthcare applications, and automotive and industrial applications.

Conventional electrochemical sensors generally include two or more electrodes disposed in a liquid electrolyte reservoir. The two or more electrodes include a sensing electrode, a counter electrode and, in some instances, a reference electrode. Target molecules or analytes interact with the sensing electrode inducing a redox or charge transfer reaction. The interaction of the sensing electrode and the target analytes produce ions (e.g., protons, $OH^-$) and counter charges (e.g., electrons). The charges (e.g., electrons) flow through an external detection module electrically coupled to the sensing electrode and the counter electrode to complete an external portion of a circuit and the ions flow through the liquid electrolyte reservoir to complete an internal portion of the circuit. Thus, a current proportional to the analyte concentration flows between the electrodes and can be quantified by the external detection module.

Liquid electrolyte reservoirs of the type described above, however, are impracticable for many desired uses of electrochemical sensors and can experience liquid leaks and spills. In certain instances, small packaged electrochemical gas sensors that include a porous membrane soaked with a liquid electrolyte sandwiched between the electrodes have been proposed as a substitute for the liquid electrolyte reservoir. Such sensors, however, have limited life and are prone to errors resulting from drying of the electrolyte.

More recently, solid state electrochemical sensors have been proposed in which liquid electrolyte reservoirs are replaced with solid electrolytes (e.g., ion exchange membrane (IEM) materials), which are solid polymers that support the transportation of ions to complete the internal portion of the circuit. In such a device, an ion exchange membrane is sandwiched between two electrode assemblies. The IEM operates not only as a solid electrolyte, but also as an electrical insulator such that counter charges flow through an external portion of the circuit through an external module that is electrically coupled to each of the two electrode assemblies. Electrode assemblies in certain such devices are composed of platinum and carbon black or a platinum-ruthenium alloy and carbon black. Such IEM-based sensors have been proposed for use in limited gas sensing applications such as, for example, for breathalyzers. IEM-based sensors have not gained wide acceptance for such applications, however, in part because of the high cost of platinum (Pt)/carbon black electrodes and platinum-ruthenium (Pt—Ru)/carbon black electrodes. Further, such ion exchange membrane devices need to be regularly recalibrated and used to avoid a loss of functionality. Most ion exchange membrane devices of this type have subpar signal quality and require a liquid reservoir for collecting by-products of the redox reaction. Thus, electrochemical sensors of this type have been met with limited success because of a variety of issues such as material costs, signal quality, measurement accuracy, high operational temperatures, high power consumption, and limited life.

More recent attempts to resolve some of the above-described problems have explored potential use of a proton exchange membrane (PEM) and thin layers of nanomaterials such as graphene and thin layers of platinum. Such a device theoretically has a number of advantages over other devices described in the prior art, but attempts to utilize such devices also have been met with limited success due to a variety of problems. For example, prior to the present disclosure, attempts to fabricate such a device have been unsatisfactory. Therefore, a need remains for further improvements in the fabrication of thin multilayer membrane materials useful for making electrochemical sensing device components and for other uses. The present disclosure addresses this need.

SUMMARY

In one aspect, the present disclosure provides methods for fabricating an electrochemical sensor material. In one embodiment, the method includes: (i) providing a proton exchange membrane having a first surface and an opposing second surface, the proton exchange membrane composed of a polymeric material having a glass transition temperature and having a total membrane thickness; (ii) positioning a first layer of molded graphene nanoplatelets adjacent the first surface of the proton exchange membrane to provide a multilayer stack; (iii) applying heat to the proton exchange membrane in an amount sufficient to bring a first region of the proton exchange membrane adjacent the first surface to the glass transition temperature, thereby providing a softened first region; (iv) applying compressive pressure to the multilayer stack in an amount sufficient to press a first portion of the first layer of conductive nanomaterial into the softened first region, thereby producing a first integrated layer that includes the first portion of the first layer of graphene nanoplatelets integrated with the polymeric material of the softened first region; (v) permitting the polymeric material of the first integrated layer to cool to a temperature below the glass transition temperature; and (vi) exfoliating a second portion of the first layer of conductive nanomaterial from the first integrated layer, thereby uncovering the first integrated layer. In one embodiment, the first integrated layer has a first thickness of from about 9 to about 11 microns. In another embodiment, the first integrated layer has a first thickness that is from about 5% to about 6% of the total membrane thickness. In yet another embodiment, said permitting the polymeric material to cool comprises permitting the polymeric material to cool for at least one hour at standard temperature and pressure in atmosphere before said exfoliating. In still yet another embodiment, said applying heat and applying compressive pressure includes positioning the multilayer stack between first and second planar members, wherein each of the planar members is composed of a material that is inert with respect to the polymeric material and the conductive nanomaterial, and that has hardness and heat transmission properties effective to transmit heat to the multilayer stack and to transmit pressure to the multilayer stack. In one embodiment, each of the first and second planar members comprises a glass sheet.

In another aspect of the disclosure, a method for fabricating an electrochemical sensor material includes: (i) providing a proton exchange membrane having a first surface and an opposing second surface, the proton exchange membrane composed of a polymeric material having a glass transition temperature and having a total membrane thickness; (ii) positioning a first layer of molded graphene nanoplatelets adjacent the first surface of the proton exchange membrane and a second layer of molded graphene nanoplatelets adjacent the second surface of the proton exchange membrane to provide a multilayer stack; (iii) applying heat to the proton exchange membrane in an amount sufficient to bring a first region of the proton exchange membrane adjacent the first surface and a second region of the proton exchange membrane adjacent the second surface to the glass transition temperature, thereby providing a softened first region adjacent the first surface and a softened second region adjacent the second surface; (iv) applying compressive pressure to the multilayer stack in an amount sufficient to press a first portion of the first layer of molded graphene nanoplatelets into the softened first region, thereby producing a first integrated layer that includes the first portion of the first layer of graphene nanoplatelets integrated with the polymeric material of the softened first region, and to press a first portion of the second layer of graphene nanoplatelets into the softened second region, thereby producing a second integrated layer that includes the first portion of the second layer of graphene nanoplatelets integrated with the polymeric material of the softened second region; (v) permitting the polymeric material of the first integrated layer and the polymeric material of the second integrated layer to cool to a temperature below the glass transition temperature; (vi) exfoliating a second portion of the first layer of molded graphene nanoplatelets from the first integrated layer, thereby uncovering the first integrated layer; and (vii) exfoliating a second portion of the second layer of molded graphene nanoplatelets from the second integrated layer, thereby uncovering the second integrated layer. In one embodiment, the method further includes (viii) depositing a metal layer over the first integrated layer to provide a metal-coated membrane; and (ix) cutting the metal-coated membrane to provide a sized metal-coated membrane having a first length and a first width. In yet another embodiment, the method further includes (x) affixing a first electrical contact to the metal layer in electrical communication with the metal layer, and (xi) affixing a second electrical contact to the second integrated layer in electrical communication with the second integrated layer to provide an electrochemical sensor component.

In another embodiment of the method, the first layer of molded graphene nanoplatelets comprises metal nanoparticles integrated in the molded graphene nanoplatelets. In this embodiment, the first integrated layer comprises both graphene nanoplatelets and metal nanoparticles integrated with the polymeric material of the softened first region. In this embodiment, a separate metal layer need not be deposited over the first integrated layer, as the first integrated layer in this embodiment provides the functionality of both the integrated layer and the metal layer of other embodiments. In one embodiment, the metal nanoparticles comprise platinum nanoparticles.

In another aspect of the present disclosure, there is provided a method for fabricating an electrochemical sensor component. In one embodiment, the method includes: (i) providing a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the multilayer proton exchange membrane having a total membrane thickness, the first integrated layer having a first thickness, the second integrated layer having a second thickness and the nonconductive ion-permeable layer having a third thickness, the nonconductive ion-permeable layer comprising a polymeric material and each of the first and second integrated layers comprising graphene nanoplatelets embedded in the polymeric material; and (ii) cutting the multilayer membrane to provide a sized multilayer membrane having a first length and a first width. In one embodiment, the method further includes, before said cutting, depositing a metal layer over the first integrated layer to provide a metal-coated membrane. In one embodiment, the metal layer comprises a platinum layer. In another embodiment, the first integrated layer comprises graphene nanoplatelets and metal nanoparticles embedded in the polymeric material. In one embodiment, the metal nanoparticles comprise platinum nanoparticles.

In one embodiment of the method, the cutting comprises pulling the multilayer membrane against a fixed-position cutting tool. In another embodiment of the method, the pulling includes compressing first and second sections of a leading edge of the multilayer membrane between first and second clamps positioned on opposite sides of a desired cut line; and applying a pull tension to the multilayer membrane in a first direction toward the cutting tool by exerting a pulling force on the first and second clamps in the first direction. In one embodiment, the cutting tool comprises a stationary cutting blade.

In another embodiment, the method further includes, after said cutting and before said affixing, exposing the sized multilayer membrane to an elevated singe temperature to remove any chads present at a cut edge of the sized multilayer membrane as a result of said cutting. In one embodiment, the elevated singe temperature is a temperature of from about 320 to about 380° F. In yet another embodiment, the polymeric material comprises a sulfonated tetrafluoroethylene-based polymer. The membrane can have a wide variety of dimensions, such as overall membrane thickness and a thicknesses of the membrane's respective layers. In one embodiment, the total membrane thickness is from about 160 to about 200 microns. In one embodiment that includes a metal layer, the metal layer has a thickness of from about 50 to about 200 Angstroms (A). In another embodiment, the first thickness is from about 9 to about 11 microns and the second thickness is from about 9 to about 11 microns. In yet another embodiment, each of the first thickness and the second thickness is from about 5% to about 6% of the total membrane thickness.

In another embodiment, the method further includes affixing a first electrical contact in electrical communication with the metal layer (when present) or to the first integrated layer (when metal nanoparticles are included in the first integrated layer) and a second electrical contact in electrical communication with the second integrated layer to provide an electrochemical sensor component. In still another embodiment, the method further includes enclosing the electrochemical sensor component within an enclosure that is operable to permit a gaseous analyte to contact the metal layer. In yet another embodiment, the enclosing includes providing a first film defining a first opening therethrough, the first film composed of a material that is water-impervious and vapor-impervious; attaching a vent to the first film in a manner whereby the vent sealingly covers the first opening, the vent composed of a material that is water-impervious but that permits flow of a gaseous analyte therethrough; orienting the first film with the electrochemical sensor component adjacent the metal layer such that the first opening and the vent overlie the metal layer (when present) or the first integrated layer (when metal nanoparticles are included in the first integrated layer); providing a second film defining a second opening therethrough, the second film composed of a material that is water-impervious and vapor-impervious; orienting the second film with the electrochemical sensor component adjacent the second integrated layer such that the second opening overlies the second integrated layer; and sealing the first and second films to one another such that the multilayer membrane is contained within a sensor chamber defined by the first and second films and such that the first and second electrical contacts extend to a position outside the sensor chamber.

In still another aspect of the present disclosure, there is provided an electrochemical sensor component that includes: (i) a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the multilayer proton exchange membrane having a total membrane thickness, the first integrated layer having a first thickness, the second integrated layer having a second thickness and the nonconductive ion-permeable layer having a third thickness, the nonconductive ion-permeable layer comprising a polymeric material and each of the first and second integrated layers comprising graphene nanoplatelets embedded in the polymeric material; and (ii) a metal layer positioned over the first integrated layer. In one embodiment, the component further includes a first electrical contact affixed to the metal layer in electrical communication with the metal layer and a second electrical contact affixed to the second integrated layer in electrical communication with the second integrated layer.

In still another aspect of the present disclosure, there is provided an electrochemical sensor component that includes a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the multilayer proton exchange membrane having a total membrane thickness, the first integrated layer having a first thickness, the second integrated layer having a second thickness and the nonconductive ion-permeable layer having a third thickness, the nonconductive ion-permeable layer comprising a polymeric material, the first integrated layer comprising graphene nanoplatelets and metal nanoparticles embedded in the polymeric material and the second integrated layer comprising graphene nanoplatelets embedded in the polymeric material. In one embodiment, the component further includes a first electrical contact affixed to the first integrated layer in electrical communication with the first integrated layer and a second electrical contact affixed to the second integrated layer in electrical communication with the second integrated layer.

In still yet another aspect, the present disclosure provides an electrochemical sensor that includes an electrochemical sensor component in accordance with one of the embodiments set forth above and a detection module electrically connected to said first and second contacts. In one embodiment, the sensor further includes a containment system operable to permit a gaseous analyte in the environment of the sensor to contact the metal layer (when present) or the first integrated layer (when metal nanoparticles are included in the first integrated layer) and operable to prevent liquids and contaminants from contacting the electrochemical sensor component. In another embodiment, the containment system includes a first film defining a first opening therethrough, the first film composed of a material that is water-impervious and vapor-impervious; a vent attached to the first film in a manner whereby the vent sealingly covers the first opening, the vent composed of a material that is water-impervious but that permits flow of a gaseous analyte therethrough, wherein the first film is oriented such that the first opening and the vent overlie the metal layer (when present) or the first integrated layer (when metal nanoparticles are included in the first integrated layer); a second film defining a second opening therethrough, the second film composed of a material that is water-impervious and vapor-impervious, wherein the second film is oriented such that the second opening overlies the second integrated layer; and a seal operable to seal the first and second films to one another such that the electrochemical sensor component is contained within a sensor chamber defined by the first and second films and such that each of the first and second electrical contacts extends to a position outside the sensor chamber. In one embodiment, each of the first and second films comprises a polycarbonate film.

In another aspect, the present disclosure provides an electrochemical sensor for the detection of analytes that includes (i) a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the nonconductive ion-permeable layer having a third thickness, the nonconductive ion-permeable layer comprising a polymeric material and each of the first and second integrated layers comprising graphene nanoplatelets embedded in the polymeric material, and (ii) a sensing layer disposed upon the first integrated layer. A first generally planar boundary lies between the nonconductive ion-permeable layer and the first integrated layer and a second generally planar boundary lies between the nonconductive ion-permeable layer and the second integrated layer. The sensing layer is disposed over a generally planar surface of the first integrated layer such that the first integrated layer is disposed between the nonconductive ion-permeable layer and the sensing layer. In an alternate embodiment, metal nanoparticles are embedded in the polymeric material along with graphene nanoplatelets in the first integrated layer and a separate sensing layer is not required, as the first integrated in this embodiment operates as the sensing layer. The sensing layer (whether the sensing layer is a separate layer or the first integrated layer operates as the sensing layer) is configured to generate protons and counter charges in response to select analytes. The second integrated layer is configured to complete a proton generating reaction initiated at the sensing layer. In one embodiment, the polymeric material comprises at least one ionomer. In another embodiment, the polymeric material comprises a sulfonated tetrafluoroethylene-based polymer. Suitable polymeric materials include, for example, polymers commercially available under the trademark Nafion® (which is a registered trademark of E. I. DuPont de Nemours and Company). In another embodiment, the sensing layer has a thickness of from about 50 to about 200 Angstroms (A). In yet another embodiment, the sensing layer includes one or more material selected from the group consisting of platinum (Pt), tin (Sn), zinc (Zn), ruthenium (Ru), copper (Cu), titanium (Ti), chromium (Cr), gold (Au), silver (Ag), nickel (Ni) and combinations thereof. In still another embodiment, each of first and second integrated layers has a thickness of from about 9 to about 11 microns. In still yet another embodiment, the electrochemical sensor further comprises a detection module that is electrically coupled to a first electrode in electrical communication with at least one of the first integrated layer and the sensing layer and to a second electrode in electrical communication with the second subsurface integrated layer, and is configured to measure a change in current or voltage traveling therethrough.

Still other features, characteristics, objects and benefits of the disclosure will become apparent from the following description.

Figure 1:
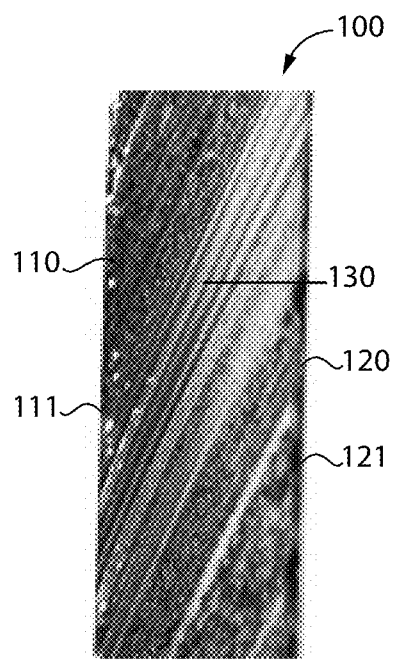
FIG. 1 is a cross-sectional view of one embodiment of an electrochemical sensor material.

It should be understood that the drawings are not necessarily to scale and that the disclosed embodiments are sometimes illustrated diagrammatically and in partial views. In certain instances, details which are not necessary for an understanding of the disclosed methods and devices or which render other details difficult to perceive may have been omitted. It should be further understood that this disclosure is not limited to the particular embodiments illustrated herein.

DETAILED DESCRIPTION OF ILLUSTRATED EMBODIMENTS

For the purposes of promoting an understanding of the principles of the invention, reference will now be made to the embodiments described herein and illustrated in the figures and specific language will be used to describe the same. The embodiments of the present application described below are not intended to be exhaustive or to limit the teachings of the present application to the precise forms disclosed in the following detailed description. Rather, the embodiments are chosen and described so that others skilled in the art may appreciate and understand the principles and practices of the present application. It will therefore be understood that no limitation of the scope of the invention is intended by the description of specific embodiments. Any alterations and further modifications in the described embodiments, and any further applications of the principles of the invention as described herein are contemplated as would normally occur to one skilled in the art to which the invention relates.

Unless defined otherwise, all technical and scientific terms used in this disclosure have the same meaning as commonly understood by one of ordinary skill in the art to which this application belongs. Moreover, it should be understood that when certain values and ranges are recited herein in connection with various embodiments of the present teachings, all values and ranges which fall between such listed values and ranges are intended to be encompassed by the present teaching unless explicitly stated otherwise. Finally, although specific methods and materials are described herein with respect to certain exemplary aspects of the present disclosure, it should be understood and appreciated that other methods and materials similar or equivalent to those described herein can be used in the practice or testing of the present application without straying from the intended scope of this disclosure.

Problems and challenges associated with the fabrication of thin-film electrochemical devices in the prior art are addressed by the present disclosure, which provides new fabrication methods and also new device structures. In the present disclosure, certain electrochemical sensor materials, components and devices are described in detail that are operable to detect ethanol vapor and measure ethanol vapor concentration, and that are fabricated using specific materials. More particularly, certain electrochemical sensor materials, components and devices are described that are constructed from a proton exchange membrane (PEM), graphene nanoplatelets and platinum metal, and which have excellent functionality for breathalyzers and other ethanol-measuring sensors. This disclosure is not intended, however, to be limited to ethanol sensing devices or to devices made using these specific materials, it being understood that alternative materials can be used and that the principles set forth in this disclosure also are applicable to devices having other functionalities and to the manufacture of multilayer materials, components and devices of other types. In addition, while specific examples of methods for fabricating devices that are operable as ethanol sensors, and examples of methods for fabricating materials and components that are operable as a components of ethanol sensors, are described herein, multiple aspects of the fabrication methods disclosed herein are applicable and useable in the fabrication of other thin-film membrane stacks and multilayer membranes of other types, such as, for example, methods in which it is desirable to apply heat and pressure to a multilayer film stack to create an integrated layer adjacent a surface thereof, or methods in which it is desirable to cut a thin-film membrane stack.

One aspect of this disclosure is directed to methods for forming a membranous electrochemical sensor material that is composed of a polymeric PEM and a conductive nanomaterial. In one embodiment, a polymeric PEM having opposite surfaces is modified by incorporating graphene nanoplatelets into a subsurface region adjacent at least one surface of the PEM to provide an integrated layer that includes graphene nanoplatelets embedded in the polymeric material adjacent that surface. In another embodiment, a polymeric PEM having opposite surfaces is modified by incorporating graphene nanoplatelets into a subsurface region adjacent both surfaces of the PEM to provide integrated layers that includes graphene nanoplatelets embedded in the polymeric material adjacent both surfaces. A photograph of a cross section of a representative polymeric PEM so modified is depicted in FIG. 1, in which multilayer membrane 100 includes opposing integrated layers 110, 120 adjacent each opposing surface, 111, 121 of multilayer membrane 100, and separated by a middle layer 130 that is composed of the polymeric material of the original, unmodified polymeric PEM (also referred to herein as a nonconductive ion-permeable layer). Multilayer membrane 100 thus is also referred to herein as a multilayer graphene-PEM-graphene membrane stack. The term "graphene" when used in the expression "graphene-PEM-graphene membrane stack" in this disclosure refers to a layer of the multilayer membrane in which graphene nanoplatelets have been embedded in or integrated into a subsurface region of the original PEM to a certain depth to provide a layer adjacent the surface that includes graphene nanoplatelets integrated with the original PEM. This layer, referred to as an "integrated layer" herein, is a composite of the graphene and the polymeric material of the PEM. Relatedly, the term "PEM" as used in this disclosure, depending on context, refers either to an original PEM starting material that is used to fabricate a graphene-PEM-graphene membrane stack or, alternatively, to the portion of the membrane stack in which graphene has not been embedded or integrated during fabrication processes described herein (which, in this latter context, also is referred to as a "PEM layer" or "nonconductive ion-permeable layer"). For example, when the term "PEM" is used in the expression "graphene-PEM-graphene membrane stack," the term PEM identifies a middle layer of the original PEM and the nonconductive ion-permeable layer of the multilayer stack, i.e., with reference to FIG. 1, refers to layer 130 lying between two opposing integrated layers 110, 120 in which graphene is integrated into the polymeric material. A graphene-PEM-graphene membrane stack as disclosed herein typically has a total membrane thickness of from about 150 to about 250 microns, however, the disclosure is not limited to thicknesses within this particular range.

Figure 2:
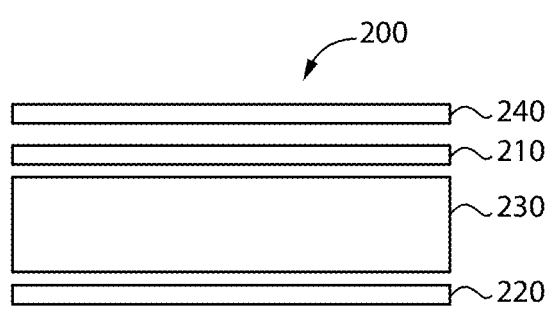
FIG. 2 is an exploded schematic cross-sectional view of another embodiment of an electrochemical sensor material.

In one embodiment, in addition to forming a modified PEM by incorporating graphene nanoplatelets into an integrated region adjacent each surface of the PEM, the method further includes depositing a layer of platinum on one side of a generally planar graphene-PEM-graphene membrane stack to provide a platinum-graphene-PEM-graphene membrane stack. For example, with reference to FIG. 2, which is an exploded schematic cross-sectional view of a representative platinum-graphene-PEM-graphene membrane stack, multilayer membrane 200 includes integrated layers 210, 220 separated by a middle layer 230 that is composed of the polymeric material of the original, unmodified polymeric PEM, and platinum layer 240 positioned over first integrated layer 210. In alternate method embodiments, a second layer of platinum (not shown) can be deposited on a second side of the graphene-PEM-graphene material such that the second layer of platinum is positioned over second integrated layer 220 to provide a platinum-graphene-PEM-graphene-platinum membrane stack; however, in preferred embodiments only a single platinum layer is deposited as shown in FIG. 2.

While fabrication methods are described herein primarily in the context of metal-coated membranes as described above, in which a single layer 240 of platinum or other metal is deposited over first integrated layer 210 of a graphene-PEM-graphene multilayer membrane, the present disclosure also contemplates embodiments and fabrication methods in which metal layer 240 is omitted and in which metal nanoparticles are embedded within first integrated layer 210 along with graphene nanoplatelets. In such embodiments, first integrated layer 210 comprises a mixed metal-nanoplatelet composite. This can be accomplished, for example, by providing a molded graphene nanoplatelet material having metal nanoparticles, such as platinum nanoparticles, already integrated therein prior to formation of the first integrated layer as described herein.

In another embodiment, the fabrication method further includes cutting an electrochemical sensor material made as disclosed herein to a size having desired length and width dimensions for use as an electrochemical sensor component. In other method embodiments, as discussed further hereinbelow, electrodes are connected to the exposed platinum and graphene layers or, in embodiments in which a metal layer is omitted, are connected to the exposed first and second integrated layers, on each side of the electrochemical sensor component and additional components are assembled to provide a functional electrochemical sensor.

The PEM selected for use to fabricate an electrochemical sensor material, component or device can be composed of a variety of polymeric materials. The PEM selected for use in a particular embodiment is one that is composed of a polymeric material that is operable to function as a solid electrolyte for an electrochemical sensor, i.e., to achieve selective transmission of protons, or cations, under the conditions for which it is intended to be used. A typical proton exchange membrane is composed of a polymer material that features fixed anionic groups and mobile cations (e.g., $H^+$). In various embodiments, proton exchange membranes may have sulfur trioxide ($SO_3^-$), phosphate ($PO_4^-$), carbonate ($CO_3^-$) groups or a combination thereof as proton exchange groups. In one preferred embodiment the PEM is composed of a polymeric material comprising at least one ionomer. In another embodiment, the polymeric material comprises a sulfonated tetrafluoroethylene-based polymer. Suitable polymeric materials include, for example, polymers commercially available under the trademark Nafion® (which is a registered trademark of E. I. DuPont de Nemours and Company). In another embodiment, the PEM comprises Nafion® 117. In some preferred embodiments, the PEM has a thickness of from about 100 to about 300 microns or from about 150 to about 250 microns. In one embodiment, the PEM has a thickness of about 180 microns.

Figure 3:
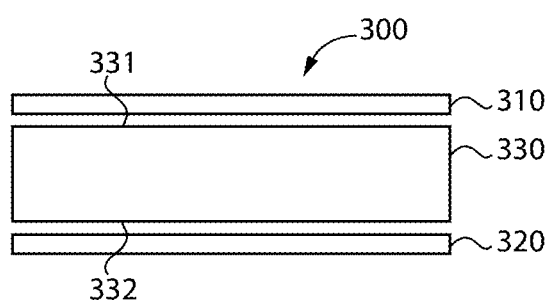
FIG. 3 is an exploded schematic cross-sectional view of a layered stack of molded graphene nanoplatelets and PEM for making an electrochemical sensor material according to one embodiment.

To fabricate an electrochemical sensor material comprising a graphene-PEM-graphene membrane stack as described above, a PEM is first sandwiched between two layers of graphene. If it is desired to make a membrane stack having an integrated layer on only one side (a graphene-PEM membrane stack), a graphene layer would be included on only one side of the PEM. Heat is then applied to the PEM to increase the temperature of at least the surfaces (or at least the one surface to be modified in the event that a graphene-PEM membrane stack is to be made) of the PEM to the glass transition temperature (Tg) of the polymeric material of which it is composed, and the graphene is embedded or integrated into a subsurface region of the softened PEM. In one embodiment, as depicted schematically in FIG. 3, first molded graphene nanoplatelet layer 310 is placed adjacent a first side 331 of PEM 330 and second molded graphene nanoplatelet layer 320 is placed adjacent a second side 332 of PEM 330. With the layers so arranged, heat is applied in an amount sufficient to bring PEM 330, or at least regions adjacent surfaces 331, 332 of PEM 330, to its Tg to soften the polymeric material in the surface regions of PEM 330. In one embodiment, the heating achieves softening of PEM 330 up to a depth of at least five microns beneath surfaces 331, 332. In another embodiment, the heating achieves softening up to a depth of at least ten microns. In one preferred embodiment, the heating achieves softening to a depth of ten microns beneath surfaces 331, 332. In a preferred embodiment, care is taken to avoid increasing the temperature of PEM 330 above the Tg of the polymeric material of which it is composed.

With the surface regions of PEM 330 softened, positive pressure (i.e., compressive pressure) is applied to the stacked layers in a direction generally transverse to the plane in which the stacked layers lie. Application of the pressure causes a portion of each molded graphene nanoplatelet layer 310, 320 to be incorporated or embedded into a subsurface region of PEM 330 adjacent each opposing surface 331, 332 of PEM 330, which produces subsurface regions in which the graphene is embedded or integrated into the softened polymeric material of the PEM. The quantity of pressure applied can vary, and selection of a suitable pressure can be based on a variety of factors, including, for example, characteristics of the polymer material of the membrane, the membrane heating protocol and the like, provided that the pressure applied does not degrade the quality of the membrane layers to a point that they become inoperable for their intended use, such as by creating electrical shorts. In one embodiment, the pressure applied to the stacked layers is a pressure of from about 2 to about 40 pounds per square inch (PSI). In other embodiments, the pressure applied is a pressure of from about 5 to about 20 PSI or a pressure of from about 8 to about 15 PSI. In yet another embodiment, the pressure applied is a pressure of about 12 PSI.

After sufficient portions of molded graphene nanoplatelet layers 310, 320 have been incorporated into the subsurface regions adjacent each opposing surface 331, 332 of PEM 330 under conditions of softening heat and applied positive pressure, the modified thin film stack is permitted to cool to a temperature below the glass transition temperature, whereupon the polymeric material of the PEM hardens to provide hardened graphene-integrated regions adjacent each surface 331, 332 of PEM 330. The modified thin film stack is advantageously allowed to cool for at least one hour at standard temperature and pressure in atmosphere.

After cooling, excess graphene nanoplatelets, i.e., portions of the molded graphene nanoplatelet layers 310, 320 that were not integrated into subsurface regions of PEM 330, are exfoliated from the modified PEM surfaces to provide a graphene-PEM-graphene membrane stack, such as that shown in FIG. 1. In one manner of exfoliating the surfaces, the excess graphene nanoplatelets are peeled from the modified PEM surfaces, which leaves a modified PEM having a graphene-PEM-graphene structure that is useful as an electrochemical sensor material. The graphene-PEM-graphene membrane stack so made includes integrated layers 110, 120 on each opposing side of middle PEM layer 130. Experiments designed to measure the transfer efficiency of graphene material into the PEM material using methods as described herein have shown that approximately 2-4% of the graphene in molded graphene nanoplatelet layers 310, 320 is transferred into the integrated regions 110, 120 of the PEM according to the method described above and remained therein following exfoliation.

In one embodiment, the PEM starting material for the above-described process comprises a film composed of a polymeric material comprising at least one ionomer. In another embodiment, the polymeric material comprises a sulfonated tetrafluoroethylene-based polymer. Suitable polymeric materials include, for example, polymers commercially available under the trademark Nafion® (which is a registered trademark of E. I. DuPont de Nemours and Company). In one embodiment, the PEM has a thickness of from about 100 to about 300 microns or from about 150 to about 250 microns. In another embodiment, the PEM has a thickness of about 180 microns. In one embodiment, molded graphene nanoplatelet layers 310, 320 comprise molded graphene nanoplatelet material having a thickness of from about 40 microns to about 50 microns and having a density of from about 1.5 $g/cm^3$ to about 2.5 $g/cm^3$. In another embodiment, application of heat and pressure to form a graphene-PEM-graphene membrane stack is controlled such that, following exfoliation, each graphene layer has a thickness of from about 5 to about 20 microns and the PEM layer therebetween has a thickness of from about 140 to about 190 microns.

Figure 4:
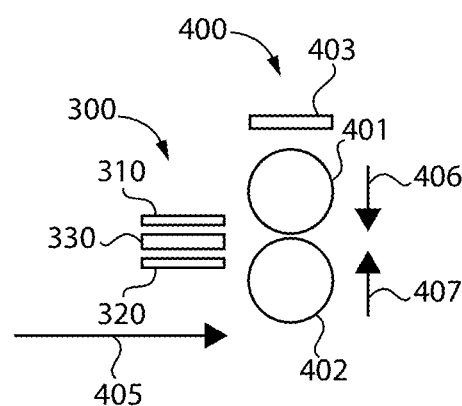
FIG. 4 is a schematic side view of a layered stack embodiment and a laminator embodiment.

In one manner of forming a graphene-PEM-graphene membrane stack, both the heat and the pressure are applied to the stacked layers using a laminator that has dual rollers and that has one or more heating element configured to heat one or both of the rollers. For example, as depicted schematically in FIG. 4, a layered stack 300 of molded graphene nanoplatelet layers 310, 320 and PEM 330 is fed into laminator 400, which includes rollers 401, 402 and heating element 403, by moving layered stack 300 through laminator 400 between rollers 401, 402 in a direction relative to laminator 400 as represented by arrow 405.

In another approach, both the heat and the pressure are applied to the thin film stack using a hot press, a wide variety of which are available commercially. In yet another approach (not shown), the PEM 330 sandwiched between two pieces of molded graphene nanoplatelets 310, 320 can be clamped between planar structural members, such as, for example, glass sheets, to apply pressure and one or both of the planar structural members can be heated with a heat gun or other heat delivery mechanism to raise the PEM to the Tg of the polymeric material of which it is composed. The present disclosure is not limited to a particular manner of applying heat and pressure, it being understood that a wide variety of approaches are within the purview of a person of ordinary skill in the art.

In a method that uses a laminator to apply heat and pressure, laminator 400 can be set up and calibrated such that rollers 401, 402 apply a predetermined amount of positive pressure on thin film stack 300 in the directions represented by arrows 406, 407 as stack 300 passes therebetween. By incorporating one or more heating element, such as heating element 403, into the laminator, it also can be configured to transfer heat to thin film stack 300 at a desired rate and in a desired amount as it passes between rollers 401, 402 to achieve heating PEM 330 to the Tg, but not above the Tg, of the PEM. In certain embodiments, the method is performed using a laminator having a heating element that heats only one of the two rollers.

Figure 5:
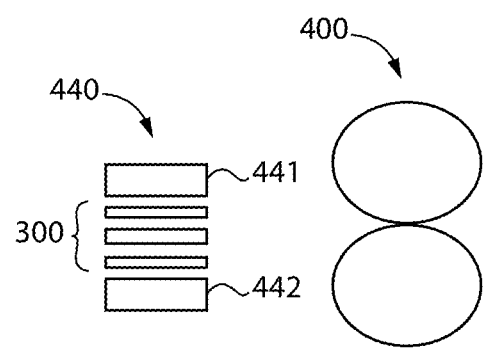
FIG. 5 is a schematic side view of a layered stack embodiment positioned between glass sheets oriented and positioned for passage through a laminator.

In one embodiment, prior to passage through a laminator, a thin film stack comprising PEM sandwiched between two pieces of molded graphene nanoplatelets is positioned between two sheets composed of a material that enables the sheets to operate together as a form that holds the thin film stack as heat and compressive pressure are applied to the thin film stack. Preferred materials for the form sheets are materials that have a combination of properties including the following: (i) is inert with respect to the PEM and the graphene material, (ii) allows adequate heat transmission to enable the surface of the PEM to reach Tg under normal operating conditions, and (iii) has sufficient hardness to hold its shape and maintain a desired amount of compressive pressure to the thin film stack to achieve integration of the graphene nanoplatelets into the softened PEM to provide an integrated layer. In one embodiment, the form sheets are composed of glass. As depicted in FIG. 5, thin film stack 300 is positioned between a first glass sheet 441 (or a planar structural member composed of another suitable material) and a second glass sheet 442 (or a planar structural member composed of another suitable material) to provide assembly 440 and the entire glass/thin film stack assembly 440 is inserted into laminator 400 and passes between the rotating laminator rollers 401, 402 such that glass sheets 441, 442 with thin film stack 300 therebetween passes completely through rollers 401, 402 under pressure and with application of heat. While it is possible to establish laminator pressure and temperature settings and roller rotation rate settings that will provide a graphene-PEM-graphene membrane stack having desired characteristics with only a single pass through such a laminator, in one preferred embodiment, the glass/thin film stack assembly is passed through the laminator multiple times, each pass-through referred to herein as an "iteration."

In one embodiment, between each iteration of passing the glass/thin film stack assembly through the laminator rollers, the glass/thin film stack assembly is flipped before the next iteration, i.e., the orientation thereof is reversed prior to the next iteration such that the side previously having passed through the laminator adjacent the top roller is passed through in the next iteration adjacent the bottom roller. This approach is useful, for example, when using a laminator that only includes one heating element adjacent one of the laminator rollers. Because graphene nanoplatelets are good thermal conductors and because glass also has sufficient thermal conductivity, by performing about 4-9 sequential iterations and flips in this manner, Tg at the surface of the PEM is achieved using a laminator set at a temperature of 360° F., which achieves a temperature of 200° F. at the PEM surface.

After completing about 4-9 iterations, the glass/thin film stack assembly is allowed to cool for about an hour at standard temperature and pressure in atmosphere. After cooling and exfoliation by peeling excess graphene nanoplatelets from the hardened PEM surfaces, a suitable graphene-PEM-graphene membrane stack is formed. Experimental testing has shown that a graphene-PEM-graphene membrane stack made as described herein typically exhibits a sheet resistance of from about 40 to about 500 Ω/sq. For comparison, an unmodified PEM having a thickness of about 180 microns exhibits a sheet resistance of about 12 MΩ/sq and the sheet resistance of a piece of molded graphene nanoplatelets alone is about 3 Ω/sq. Experimental testing further showed that the bulk resistance of a graphene-PEM-graphene membrane stack made as described herein, defined as the DC-current resistance from the top of the film stack to the bottom of the film stack in atmosphere at STP, is from about 300 kOhms to about 1000 kOhms.

An electrochemical sensor material such as the graphene-PEM-graphene membrane stack made as described above, is also referred to herein as a "multilayer proton exchange membrane" or a "multilayer PEM" and its surfaces are also referred to herein as "modified surfaces." With reference again to FIG. 2, in another aspect of this disclosure, a metal-coated membrane is made by depositing a layer of platinum onto one of the integrated layers of the multilayer proton exchange membrane. In one embodiment, the platinum is deposited to form a metal layer having a thickness of from about 50 to about 200 Angstroms (A). In other embodiments, the platinum layer has a thickness of from about 50 to about 150 A, a thickness of from about 75 to about 125 A or a thickness of from about 95 to 105 A. Following platinum deposition, the material is referred to as a platinum-graphene-PEM-graphene membrane stack, in which the platinum surface is operable as an anode and the opposite integrated layer is operable as a cathode in an electrochemical sensor.

Another aspect of this disclosure includes cutting a metal-coated membrane, or platinum-graphene-PEM-graphene membrane stack, that is made as described above, or other multilayer membrane, to have length and width dimensions suitable for use as an electrochemical sensor component. In one embodiment, after a sheet of the platinum-graphene-PEM-graphene membrane stack or platinum/graphene-PEM-graphene membrane stack (in an embodiment in which the first integrated layer includes platinum nanoparticles) is made as described herein, one or more component having one or more smaller length and width dimensions are cut from the larger sheet of the platinum-graphene-PEM-graphene membrane stack.

As indicated above, cutting of thin multilayer stacks has presented significant challenges in the fabrication of multilayer electrochemical sensor components in the prior art and has been a major obstacle to the commercialization of micron-size multilayer stacks. Use of prior art cutting techniques has been found to result in an excessive number of defective components. Because the different layers of a platinum-graphene-PEM-graphene membrane stack and a platinum/graphene-PEM-graphene membrane stack have different physical properties (e.g., diverse hardness, malleability, compressibility and toughness characteristics of the respective layers of the membrane stack), and due to the single micron-level thickness dimensions of the respective layers, prior art cutting techniques have been found to lead to high incidence of layer detachments and otherwise defective components that tend to result in electrical shorting and are unsuitable for their intended purpose. As will be appreciated by a person of ordinary skill in the art, for a platinum-graphene-PEM-graphene membrane stack or a platinum/graphene-PEM-graphene membrane stack to properly function as a sensor, the electrically conductive material or material(s) positioned on one side of the PEM layer (e.g., the platinum and graphene layers) must remain electrically isolated from the electrically conductive material(s) positioned on the opposite side of the PEM layer (e.g., the graphene layer). Prior art cutting techniques tend to result in detachment of the graphene and platinum layers from the PEM layer at the cutting sites because the PEM layer is much softer than the platinum and graphene layers, and also due to the fragile nature of a thin multilayer membrane stack such as a platinum-graphene-PEM-graphene membrane stack. In addition, prior art cutting techniques tend to produce graphene and/or platinum chads and other debris at the cutting site, which are difficult to remove and which cause electrical shorts across the PEM membrane.

The present disclosure provides a method for cutting a platinum-graphene-PEM-graphene membrane stack (which method also is useful for cutting thin film stacks composed of other materials) that produces a clean edge and effectively produces defect-free components at a commercially acceptable rate. The process described herein provides an economical, stable and repeatable manner of making such components and is effective to produce components having good electrical paths and good electrical transfer. Based on post-cutting electrical measurements, a platinum-graphene-PEM-graphene membrane stack component that is cut to size using the longitudinal cutting method disclosed herein has significantly fewer defects, is significantly less susceptible to electrical shorting, and has significantly higher bulk resistance than components cut to size using prior art cutting techniques, which is a substantial advantage in the commercial fabrication of electrochemical sensor devices.

In accordance with this disclosure, cutting is achieved by cutting the multilayer membrane in a manner whereby the cutting edge of a cutting tool is oriented across the full thickness of the membrane and lies generally perpendicular to a plane in which the multilayer membrane (or a portion of the membrane that is being cut) lies. In this orientation, the cutting edge of the cutting tool contacts and cuts through the various layers of the membrane simultaneously, and the relative movement between the cutting edge and the multilayer membrane causes the cutting edge to pass through the membrane in a direction generally parallel to the plane in which the multilayer membrane (or a portion of the membrane that is being cut) lies. As used herein, the term "generally perpendicular" when used in reference to a plane has the same meaning as the expression "about 90 degrees" and refers to a line that defines an angle with the plane that is a right angle or is no more than about 10 degrees greater than or less than a right angle, and the term "generally parallel" when used with reference to a plane refers to a line that is parallel with the plane or is no more than about 10 degrees from being parallel.

Figure 6:
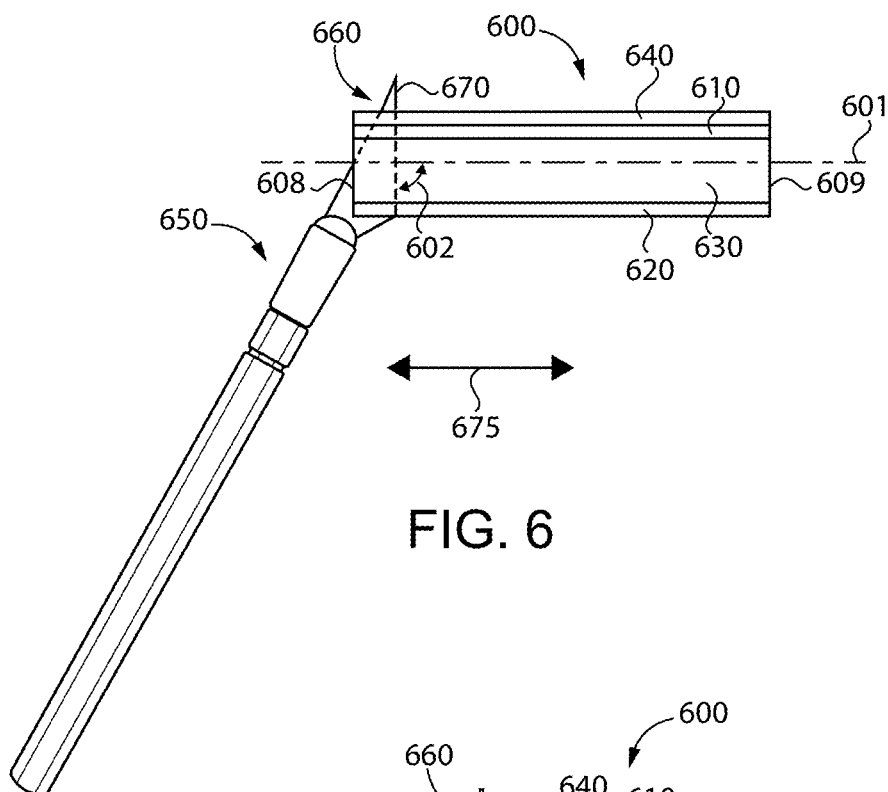
FIG. 6 is a cross-sectional view of a multilayer membrane embodiment depicted with a cutting tool.
Figure 7:
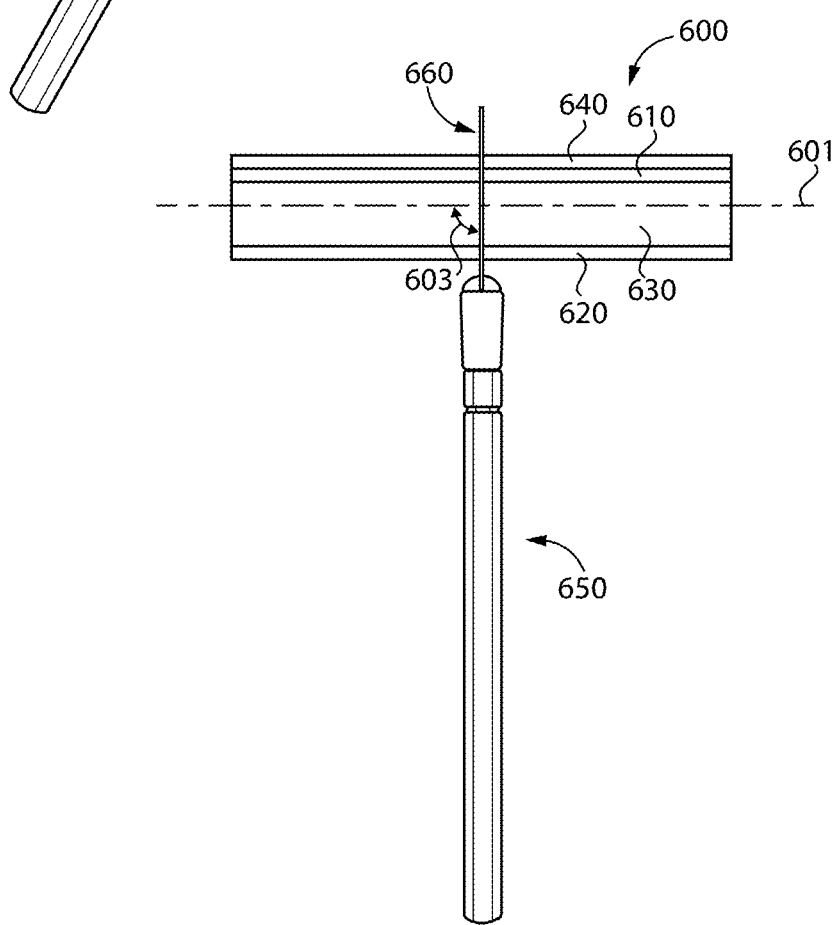
FIG. 7 is another cross-sectional view of a multilayer membrane embodiment depicted with a cutting tool.

A representative manner of cutting a multilayer membrane as described above is illustrated in FIGS. 6 and 7, in which cutting of multilayer membrane 600 is accomplished by cutting tool 650 which, by way of example, has a form similar to an X-Acto knife. Cutting tool 650 includes blade 660 that defines cutting edge 670. Multilayer membrane 600 includes integrated layers 610, 620 separated by a middle PEM layer 630, and platinum layer 640 positioned over first integrated layer 610. The direction of relative movement between cutting tool 650 and multilayer membrane 600 during a cutting action is represented by arrow 675 in FIG. 6, in which a side view of the cutting action is depicted. As shown in FIG. 6, arrow 675 is generally parallel to plane 601 of membrane 600. As further shown in FIG. 6, cutting edge 670 of cutting tool 650 passes through membrane 600 from leading edge 608 of membrane 600 toward trailing edge 609 of membrane 600, contacting and cutting through layers 610, 620, 630, 640 simultaneously. FIG. 7 depicts the orientation of cutting tool 650 and membrane 600 viewed from the perspective of leading edge 608 of membrane 600. Stated alternatively, cutting edge 670 of cutting tool 650 first contacts membrane 600 at edge 608 and passes through membrane 600 in a direction generally parallel to plane 601 in which membrane 600 generally lies, i.e., cutting edge 670 of cutting tool 650 moves relative to membrane 600 from edge 608 to opposite edge 609. In the embodiment shown, cutting edge 670 of cutting blade 660 is oriented at a first angle 602 relative to plane 601 of membrane 600 and at a second angle 603 relative to plane 601. In one embodiment, angle 602 is from about 60 degrees to about 120 degrees. In another embodiment, angle 602 is from about 75 degrees to about 105 degrees. In a further embodiment, angle 603 is from about 60 degrees to about 120 degrees. In another embodiment, angle 603 is from about 75 degrees to about 105 degrees. In still yet another embodiment, each of angle 602 and angle 603 is about 90 degrees.

This cutting method described herein is in contrast to prior art cutting techniques, referred to herein as "transverse cutting," in which a cutting tool enters a membrane stack in a direction perpendicular to the plane in which the membrane stack generally lies and first contacts the membrane stack at a surface of the membrane stack (e.g., at a point on the surface of platinum layer 640 or at a point on the surface of integrated layer 620) and passes through the membrane stack in a direction generally perpendicular to or oblique to plane 601.

Figure 8:
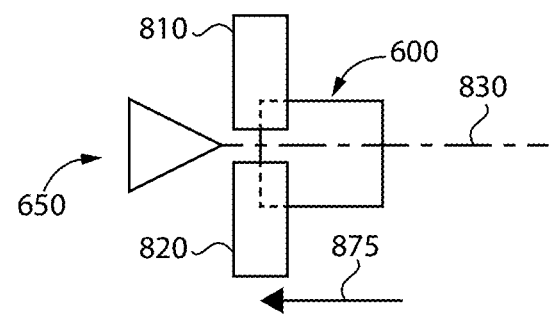
FIG. 8 is a schematic view of a membrane cutting process.

The inventors also have discovered that, in addition to cutting with the orientation and relative movement between cutting edge 670 and membrane 600 as described above, superior results are achieved by performing the cutting action in a manner whereby cutting tool 650 is retained in a generally fixed position and membrane 600 is moved across cutting tool 650 to achieve cutting. In one manner of cutting a membrane by moving the membrane across the cutting tool, depicted in FIG. 8, clamps 810, 820 are positioned at edge 608 (referred to herein as the "leading edge") of membrane 600 such that clamp 810 is positioned on a first side of a desired cut line 830. Membrane 600 is then moved in a direction toward cutting tool 650 by applying a pull tension to clamps 810, 820 in a direction represented by arrow 875, which, in turn, exert a pull tension on membrane 600 in the same direction. The pull tension moves membrane 600 in a direction toward and across cutting tool 650, and clamps 810, 820 continue exerting the pull tension on membrane 600 until the desired cut has been completed. Without intending to be limited by any particular theory whereby this disclosure achieves its advantageous results, it is believed that a pulling-type cutting action as described herein achieves superior results at least in part because a pulling-type cutting action can be achieved using clamps that impart a lower compression force on membrane 600 than would be required for other types of cutting actions. The lower compression force applied by clamps 810, 820 in this embodiment avoids creation of defects in membrane 600 that would be created by greater clamping forces or other forces and that likely would cause electrical shorts or other defects rendering a component cut from the membrane inoperable for its intended use. The compressive force applied by clamps 810, 820 in one embodiment is a force of no greater than about 20 PSI. In another embodiment, the compressive force applied by claims 810, 820 is a force no greater than about 12 PSI. The pull tension in one embodiment is a force operable to move membrane 600 across cutting tool 650 at a rate of from about 2 mm/second to about 10 mm/second.

In another embodiment, after a multilayer membrane has been cut to size to provide a sized membrane, the fabrication method further includes exposing the sized membrane to an elevated singe temperature to remove any chads or other debris that may have resulted from the cutting action at a cut edge of the sized membrane. In one embodiment, the sized membrane is heated to a singe temperature of from about 320° F. to about 380° F. Heating of a sized membrane to a singe temperature can be achieved in a variety of ways. As one example, the sized membrane can be placed in an oven set at a singe temperature. In another embodiment, the sized membrane can be passed through a laminator as described therein that is set at a heat setting sufficient to bring the sized membrane stack to a singe temperature.

Figure 9:
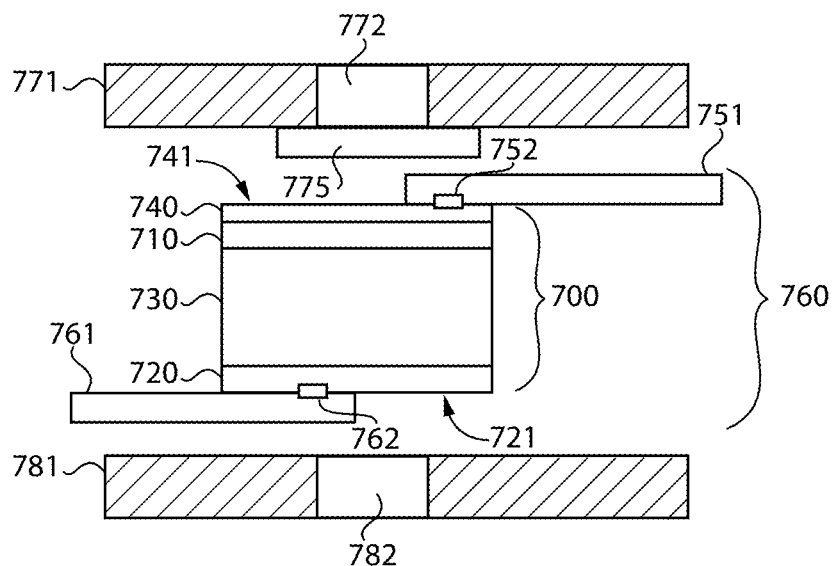
FIG. 9 is a schematic cross-sectional view of an electrochemical sensor device embodiment.

With reference to FIG. 9, following cutting and optional singing as described herein to provide a sized membrane, first electrical contact 751 is affixed to surface 741 of platinum layer 740 on one side of sized membrane 700 and second electrical contact 761 is affixed to second integrated layer 720 on the opposite side of sized membrane 700 to provide electrochemical sensor component 760. In an embodiment in which platinum layer 740 is absent and first integrated layer 710 comprises both graphene nanoplatelets and metal nanoparticles (not shown), first electrical contact 751 is affixed to first integrated layer 710. In one preferred embodiment, each of first and second electrical contacts 751, 761 comprises a copper contact. In one embodiment, each copper contact has a thickness of 100 microns or less. In one embodiment, each of electrical contacts 751, 761 is affixed to the respective surfaces using a non-water soluble conductive epoxy 752, 762. An example of a suitable epoxy includes, without limitation, a silver conductive epoxy that is commercially available from MG Chemicals as product #8331-14G.

Figure 10:
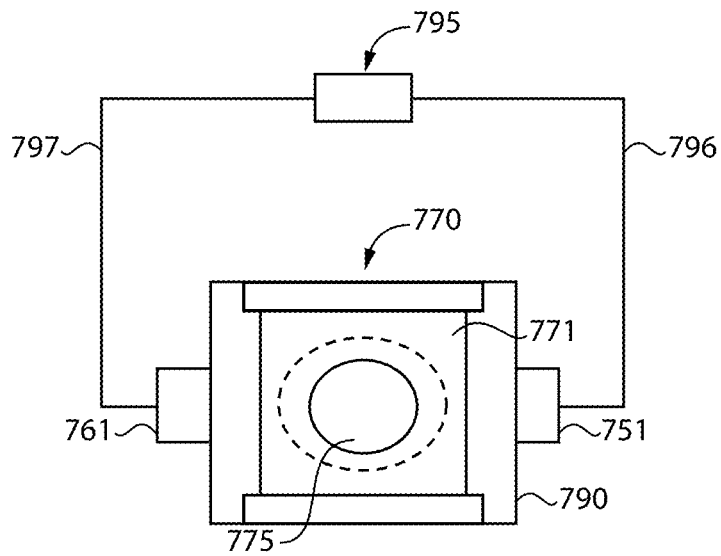
FIG. 10 is a schematic plan view of an electrochemical sensor embodiment.

Electrochemical sensor component 760 can be enclosed within an enclosure that is operable to permit ethanol to contact surface 741 of platinum layer 740, which functions as the anode of an assembled electrochemical sensor embodiment as shown in FIG. 9. It is to be understood that, in other embodiments in which a membrane stack is composed of different materials and/or a different analyte is to be detected or measured, the enclosure is operable to permit the target analyte to contact the anode within the enclosure. With reference to FIGS. 9 and 10, in one embodiment, enclosure 770 is formed from first film 771 composed of a water-impervious and vapor-impervious material and defining opening 772 therethrough and second film 781 composed of a water-impervious and vapor-impervious material and defining opening 782 therethrough, wherein first and second films 771, 781 are oriented such that opening 772 through first film 771 is positioned over surface 741 of platinum anode 740 and opening 782 through second layer 781 is positioned over surface 721 of the graphene cathode (second integrated layer 720). First and second films 771, 781 are sealed to one another such that electrodes 751, 761 extend through the seal to an external position, i.e., to a position outside the enclosure. In one embodiment, before sealing first and second films 771, 781, vent 775 is sealingly attached to first film 771 in a manner whereby vent 775 sealingly covers first opening 772. Vent 775 is composed of a material film that is water-impervious but that permits passage of ethanol vapor. In one embodiment, vent 775 is composed of a polytetrafluoroethylene membrane. In one embodiment, each of first and second films 771, 781 of enclosure 770 comprises a polycarbonate film. In another embodiment, first and second films 771, 781 are sealed to one another using a water-impervious and gas impervious tape 790, such as, for example, Kapton tape, which is composed of a polyimide substrate and a silicone adhesive.

To form a complete electrochemical sensor, detection module 795 is electrically coupled to each of first and second contacts 751, 761 by way of circuit components 796, 797 to thereby provided a completed circuit between platinum layer 740 of sized membrane 700 (which operates as the sensing layer and the anode in the electrochemical sensor system) and the graphene of second integrated layer 720 of sized membrane 700 (which operates as the cathode in the electrochemical sensor system). Detection module 795 is configured to detect a flow of charge between platinum layer 740 and second integrated layer 720, which flow of charge is directly proportional to the quantity of ethanol molecules contacting the surface of platinum layer 740. In one embodiment, detection module 795 is configured to measure a change in current or voltage traveling therethrough, which measured change corresponds to the concentration of ethanol in the gaseous environment of platinum layer 740. A bias voltage generally need not be applied to an electrochemical sensor constructed as described herein. In some embodiments, however, a DC bias voltage (e.g., less than or equal to about 1V) may be applied to enhance the sensor signal. In some embodiments, a time-varying input is applied to detection module 795 using a battery coupled to an electronic circuit and an output change in one of an AC current, AC voltage, capacitance, heterodyne, or a combination thereof is measured and correlated with ethanol concentration.

In operation, an electrochemical sensor for the detection of ethanol vapor as described herein can be positioned at a location where detection and measurement of ethanol vapor is desired, such as, for example, in a breathalyzer device used to measure the concentration of ethanol in a person's exhalation or in a bracelet or other wearable device used to measure the concentration of ethanol vapor exuded from a person's skin. Ethanol vapor in the environment of the vent in the sensor device described herein diffuses through the vent and ethanol molecules contact the surface of the platinum sensing layer. Contact of ethanol molecules with the platinum sensing layer generates protons and counter charges via a redox reaction. More specifically, ethanol is oxidized at the surface of the platinum catalyst to form carbon dioxide and also generating protons (W) and electrons. This oxidation reaction consumes water molecules at the platinum (anode) surface. Protons are transported across the PEM layer, which functions as a solid electrolyte, to the second subsurface graphene-integrated region (cathode) on the opposite side of the PEM layer, where they react with oxygen and electrons from an external circuit to produce water. Electrons are transported through the external circuit (composed of the contacts and detection module described herein) from anode to cathode, providing a completed circuit.

Ethanol concentration is determined by measuring the flow of charge through the detection module. In one embodiment, a change in voltage and/or current may be measured and correlated with the ethanol concentration. In another embodiment, a time-varying input (e.g., AC-sinusoidal, pulse, triangular excitation) may be used and an output change in AC current and/or voltage, capacitance, heterodyne, or a combination thereof, measured and correlated with the ethanol concentration.

Electrochemical sensors as disclosed herein are compatible with integration at the circuit board level. For example, certain electrochemical sensor embodiments can be packaged onto a printed circuit board, which may be operable, for example, to amplify and/or filter the sensor response. Further, the printed circuit board may transmit sensor output results wirelessly to an external computing device (e.g., a computer, handheld mobile device, tablet or the like) using, for example, Bluetooth technologies. In one embodiment, the printed circuit board has integrated circuit chips to amplify and filter the detected electronic current (I) and to convert the amplified and filtered electronic current into a voltage (V) reading. The analog voltage then can be converted to a digital voltage using an ADC integrated chip and subsequently transmitted through a Bluetooth integrated chip module to an external terminal, such as a handheld mobile device or tablet. The electrochemical sensor itself consumes a small amount (e.g., from about 10 to about 100 nW) of power.

Electrochemical sensor embodiments as disclosed herein are useful for practical standalone operations because of their small size, solid-state structure (e.g., no liquid component), rapid response and high sensitivity to changes within the immediate environment of the sensing layer. Further, electrochemical sensor embodiments as disclosed herein are compatible with conventional electronic technology. The electrochemical sensors can be used to detect clinically relevant chemical markers as well as other point-of-need applications in healthcare, environmental monitoring and workplace safety. One particularly useful application, as mentioned above, is the detection of ethanol vapors transpiring through a person's skin. The detected ethanol vapors can be used to determine the underlying blood alcohol concentration (BAC).

While this disclosure provides detailed description of materials, components, devices and methods involving a proton exchange membrane (PEM), graphene nanoplatelets and platinum metal, the disclosure is intended to be equally applicable to alternative materials, alternative combinations of materials, alternative devices and methods of making alternative materials, components and devices as would occur to a person of ordinary skill in the art in view of the disclosures herein. Moreover, alternative devices may be arranged to employ different electrochemical reactions, such as, for example, reacting with different target analytes, employing different charge transfer reactions to generate ions relating to or depending from the target analyte, etc. For example, in alternative materials, components, devices and methods, PEM is suitably substituted by other ion exchange membranes (IEMs) such as, for example, anion exchange membranes. Anion exchange membranes have fixed cationic groups and mobile anions (e.g., $OH^-$). Example anion exchange membranes include Fumasep FAA or FAP. In various instances, anion exchange membranes may have quaternary ammonium ($NR_4^+$)/phosphonium ($PR_4^+$), ammonium polysulfone groups, or combinations thereof as anion exchange groups. As another example, in alternative materials, components, devices and methods, graphene nanoplatelets are suitably substituted by other electrically conductive nanomaterials, such as, for example two dimensional materials selected from the group consisting of transition metal dichalcogenides (TMDCs), phosphorene, silicone, germanene, stanine, borophene and combinations thereof, or a mesh network of one-dimensional nanomaterials (e.g., nanotubes or nanowires), or by non-electrically conductive nano-size or micro-size materials that one may desire to integrate into one or more surface of a PEM, IEM or other membrane or film. As yet another example, in alternative materials, components, devices and methods, platinum is suitably substituted by other metals, alloys and other materials that one may desire to deposit on a PEM or on other single-layer or multilayer membranes or films. Examples of such alternative metals, alloys and other materials include, for example, alternative metals such as tin (Sn), zinc (Zn), ruthenium (Ru), copper (Cu), titanium (Ti), chromium (Cr), gold (Au), silver (Ag), nickel (Ni), combinations and alloys thereof, semiconducting nanoparticles or thin films, polymers, dyes, surface assembled layers, receptors, or combinations thereof.

As will be appreciated from the descriptions herein and the associated Figures, a wide variety of aspects and embodiments are contemplated by the present disclosure, examples of which include, without limitation, the aspects and embodiments listed below:

A method for fabricating an electrochemical sensor material that includes (i) providing a proton exchange membrane having a first surface and an opposing second surface, the proton exchange membrane composed of a polymeric material having a glass transition temperature and having a total membrane thickness; (ii) positioning a first layer of molded graphene nanoplatelets adjacent the first surface of the proton exchange membrane to provide a multilayer stack; (iii) applying heat to the proton exchange membrane in an amount sufficient to bring a first region of the proton exchange membrane adjacent the first surface to the glass transition temperature, thereby providing a softened first region; (iv) applying compressive pressure to the multilayer stack in an amount sufficient to press a first portion of the first layer of conductive nanomaterial into the softened first region, thereby producing a first integrated layer that includes the first portion of the first layer of graphene nanoplatelets integrated with the polymeric material of the softened first region; (v) permitting the polymeric material of the first integrated layer to cool to a temperature below the glass transition temperature; and (vi) exfoliating a second portion of the first layer of graphene nanoplatelets from the integrated layer, thereby uncovering the first integrated layer.

A method in accordance with any other embodiment disclosed herein wherein the first integrated layer has a first thickness of from about 9 to about 11 microns.

A method in accordance with any other embodiment disclosed herein wherein the first integrated layer has a first thickness that is from about 5% to about 6% of the total membrane thickness.

A method in accordance with any other embodiment disclosed herein wherein the polymeric material comprises a sulfonated tetrafluoroethylene-based polymer.

A method in accordance with any other embodiment disclosed herein wherein said permitting the polymeric material to cool comprises permitting the polymeric material to cool for at least one hour at standard temperature and pressure in atmosphere before said exfoliating.

A method in accordance with any other embodiment disclosed herein wherein said exfoliating comprises peeling the second portion of the graphene nanoplatelets from the surface.

A method in accordance with any other embodiment disclosed herein wherein said applying heat and applying compressive pressure comprises positioning the multilayer stack between first and second planar members, wherein each of the planar members is composed of a material that is inert with respect to the polymeric material and the molded graphene nanoplatelets, and that has hardness and heat transmission properties effective to transmit heat to the multilayer stack and to transmit pressure to the multilayer stack.

A method in accordance with any other embodiment disclosed herein wherein at least one of said first and second planar members comprises a glass sheet.

A method for fabricating an electrochemical sensor material that includes: (i) providing a proton exchange membrane having a first surface and an opposing second surface, the proton exchange membrane composed of a polymeric material having a glass transition temperature and having a total membrane thickness; (ii) positioning a first layer of molded graphene nanoplatelets adjacent the first surface of the proton exchange membrane and a second layer of molded graphene nanoplatelets adjacent the second surface of the proton exchange membrane to provide a multilayer stack; (iii) applying heat to the proton exchange membrane in an amount sufficient to bring a first region of the proton exchange membrane adjacent the first surface and a second region of the proton exchange membrane adjacent the second surface to the glass transition temperature, thereby providing a softened first region adjacent the first surface and a softened second region adjacent the second surface; (iv) applying compressive pressure to the multilayer stack in an amount sufficient to press a first portion of the first layer of graphene nanoplatelets into the softened first region, thereby producing a first integrated layer that includes the first portion of the first layer of graphene nanoplatelets integrated with the polymeric material of the softened first region and to press a first portion of the second layer of graphene nanoplatelets into the softened second region, thereby producing a second integrated layer that includes the first portion of the second layer of graphene nanoplatelets integrated with the polymeric material of the softened second region; (v) permitting the polymeric material of the first integrated layer and the polymeric material of the second integrated layer to cool to a temperature below the glass transition temperature; (vi) exfoliating a second portion of the first layer of molded graphene nanoplatelets from the first integrated layer, thereby uncovering the first integrated layer; and (vii) exfoliating a second portion of the second layer of molded graphene nanoplatelets from the second integrated layer thereby uncovering the second integrated layer.

A method in accordance with any other embodiment disclosed herein, further comprising depositing a metal layer over the first integrated layer to provide a metal-coated membrane; and cutting the metal-coated membrane to provide a sized metal-coated membrane having a first length and a first width.

A method in accordance with any other embodiment disclosed herein wherein the first layer of molded graphene nanoplatelets comprises metal nanoparticles integrated in the molded graphene nanoplatelets and wherein the first integrated layer comprises both graphene nanoplatelets and metal nanoparticles integrated with the polymeric material of the softened first region.

A method in accordance with any other embodiment disclosed herein, further comprising affixing a first electrical contact to the metal layer (when present) or to the first integrated layer (when metal nanoparticles are included in the first integrated layer) in electrical communication with the metal layer (or the first integrated layer) and affixing a second electrical contact to the second integrated layer in electrical communication with the second integrated layer to provide an electrochemical sensor component.

A method for fabricating an electrochemical sensor component that includes: (i) providing a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the multilayer proton exchange membrane having a total membrane thickness, the first integrated layer having a first thickness, the second integrated layer having a second thickness and the nonconductive ion-permeable layer having a third thickness, the nonconductive ion-permeable layer comprising a polymeric material and each of the first and second integrated layers comprising graphene nanoplatelets embedded in the polymeric material; and (ii) cutting the metal-coated membrane to provide a sized metal-coated membrane having a first length and a first width.

A method in accordance with any other embodiment disclosed herein that further includes, before said cutting, depositing a metal layer over the first integrated layer to provide a metal-coated membrane.

A method in accordance with any other embodiment disclosed herein wherein the metal layer comprises a platinum layer.

A method in accordance with any other embodiment disclosed herein wherein the first integrated layer comprises graphene nanoplatelets and metal nanoparticles embedded in the polymeric material.

A method in accordance with any other embodiment disclosed herein wherein the metal nanoparticles comprise platinum nanoparticles.

A method in accordance with any other embodiment disclosed herein wherein the polymeric material comprises a sulfonated tetrafluoroethylene-based polymer.

A method in accordance with any other embodiment disclosed herein wherein said cutting comprises orienting a cutting edge of a cutting tool across the full thickness of a multilayer membrane, such as a metal-coated membrane or other multilayer membrane, wherein the cutting edge contacts and cuts through the layers of the multilayer membrane simultaneously, and wherein the relative movement between the cutting edge and the multilayer membrane causes the cutting edge to pass through the multilayer membrane in a direction generally parallel to the plane in which the multilayer membrane lies.

A method in accordance with any other embodiment disclosed herein wherein the cutting edge of the cutting tool lies generally perpendicular to a plane in which the multilayer membrane lies.

A method in accordance with any other embodiment disclosed herein wherein the cutting tool is a fixed-position cutting tool and wherein said cutting comprises pulling the multilayer membrane against the fixed-position cutting tool.

A method in accordance with any other embodiment disclosed herein wherein the total membrane thickness is from about 160 to about 200 microns.

A method in accordance with any other embodiment disclosed herein wherein the metal layer has a metal thickness of from about 50 to about 200 Angstroms (A).

A method in accordance with any other embodiment disclosed herein wherein the first thickness is from about 9 to about 11 microns and the second thickness is from about 9 to about 11 microns.

A method in accordance with any other embodiment disclosed herein wherein each of the first thickness and the second thickness is from about 5% to about 6% of the total membrane thickness.

A method in accordance with any other embodiment disclosed herein wherein said pulling comprises compressing first and second sections of a leading edge of the multilayer membrane between first and second clamps positioned on opposite sides of a desired cut line; and applying a pull tension to the multilayer membrane in a first direction toward the cutting tool by exerting a pulling force on the first and second clamps in the first direction.

A method in accordance with any other embodiment disclosed herein wherein said cutting tool comprises a stationary cutting blade.

A method in accordance with any other embodiment disclosed herein, further comprising, after said cutting, exposing the sized multilayer membrane to an elevated singe temperature to remove any chads present at a cut edge of the sized multilayer membrane as a result of said cutting.

A method in accordance with any other embodiment disclosed herein wherein the elevated singe temperature is a temperature of from about 320 to about 380° F.

A method in accordance with any other embodiment disclosed herein, further comprising affixing a first electrical contact in electrical communication with the metal layer (when present) or to the first integrated layer (when metal nanoparticles are included in the first integrated layer) and a second electrical contact in electrical communication with the second integrated layer to provide an electrochemical sensor component A method in accordance with any other embodiment disclosed herein wherein each of the first and second electrical contacts comprises a copper contact having a thickness of up to 100 microns.

A method in accordance with any other embodiment disclosed herein wherein the first electrical contact is affixed to the metal layer (when present) or to the first integrated layer (when metal nanoparticles are included in the first integrated layer) and the second electrical contact is affixed to the second integrated layer with a conductive epoxy.

A method in accordance with any other embodiment disclosed herein wherein the epoxy is not water soluble.

A method in accordance with any other embodiment disclosed herein, further comprising enclosing the electrochemical sensor component within an enclosure that is operable to permit a gaseous analyte to contact the metal layer.

A method in accordance with any other embodiment disclosed herein wherein said enclosing comprises providing a first film defining a first opening therethrough, the first film composed of a material that is water-impervious and vapor-impervious; attaching a vent to the first film in a manner whereby the vent sealingly covers the first opening, the vent composed of a material that is water-impervious but that permits flow of a gaseous analyte therethrough; orienting the first film with the electrochemical sensor component adjacent the metal layer (when present) or to the first integrated layer (when metal nanoparticles are included in the first integrated layer) such that the first opening and the vent overlie the metal layer (when present) or to the first integrated layer (when metal nanoparticles are included in the first integrated layer); providing a second film defining a second opening therethrough, the second film composed of a material that is water-impervious and vapor-impervious; orienting the second film with the electrochemical sensor component adjacent the second integrated layer such that the second opening overlies the second integrated layer; and sealing the first and second films to one another such that the metal-coated membrane is contained within a sensor chamber defined by the first and second films and such that the first and second electrical contacts extend to a position outside the sensor chamber.

A method in accordance with any other embodiment disclosed herein wherein each of the first and second films has length and width dimensions greater than the first length and first width of the metal-coated membrane.

A method in accordance with any other embodiment disclosed herein wherein each of the first and second films comprises a polycarbonate film.

A method in accordance with any other embodiment disclosed herein wherein each of the first and second films has a thickness of up to 0.5 mm.

A method in accordance with any other embodiment disclosed herein wherein the vent comprises a polytetrafluoroethylene film.

A method in accordance with any other embodiment disclosed herein, further comprising connecting a detection module to said first and second contacts.

A method for fabricating an electrochemical sensor component that includes: (i) providing a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the nonconductive ion-permeable layer having a third thickness, the nonconductive ion-permeable layer comprising a polymeric material and each of the first and second integrated layers comprising graphene nanoplatelets embedded in the polymeric material; (ii) depositing a metal layer over the first integrated layer to provide a metal-coated membrane; and (iii) cutting the metal-coated membrane to provide a sized metal-coated membrane having a first length and a first width; wherein said cutting comprises pulling the metal-coated membrane against a fixed-position cutting tool.

An electrochemical sensor component that includes (i) a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises and a nonconductive ion-permeable layer, the multilayer proton exchange membrane having a total membrane thickness, the first integrated layer having a first thickness, the second integrated layer having a second thickness and the nonconductive ion-permeable layer having a third thickness, the nonconductive ion-permeable layer comprising a polymeric material and each of the first and second integrated layers comprising graphene nanoplatelets embedded in the polymeric material; (ii) a metal layer positioned over the first integrated layer; (iii) a first electrical contact affixed to the metal layer in electrical communication with the metal layer; and (iv) a second electrical contact affixed to the second integrated layer in electrical communication with the second integrated layer.

An electrochemical sensor component that includes (i) a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises and a nonconductive ion-permeable layer, the multilayer proton exchange membrane having a total membrane thickness, the first integrated layer having a first thickness, the second integrated layer having a second thickness and the nonconductive ion-permeable layer having a third thickness, the nonconductive ion-permeable layer comprising a polymeric material, the first integrated layer comprising graphene nanoplatelets and metal nanoparticles embedded in the polymeric material and the second integrated layer comprising graphene nanoplatelets embedded in the polymeric material; (ii) a first electrical contact affixed to the first integrated layer in electrical communication with the first integrated layer; and (iii) a second electrical contact affixed to the second integrated layer in electrical communication with the second integrated layer.

An electrochemical sensor comprising an electrochemical sensor component in accordance with any other embodiment disclosed herein and a detection module electrically connected to said first and second contacts.

A sensor in accordance with any other embodiment disclosed herein, further comprising a containment system operable to permit a gaseous analyte in the environment of the sensor to contact the metal layer (when present) or to the first integrated layer (when metal nanoparticles are included in the first integrated layer) and operable to prevent liquids and contaminants from contacting the electrochemical sensor component.

A sensor in accordance with any other embodiment disclosed herein wherein the containment system includes: (i) a first film defining a first opening therethrough, the first film composed of a material that is water-impervious and vapor-impervious; (ii) a vent attached to the first film in a manner whereby the vent sealingly covers the first opening, the vent composed of a material that is water-impervious but that permits flow of a gaseous analyte therethrough, wherein the first film is oriented such that the first opening and the vent overlie the metal layer (when present) or to the first integrated layer (when metal nanoparticles are included in the first integrated layer); (iii) a second film defining a second opening therethrough, the second film composed of a material that is water-impervious and vapor-impervious, wherein the second film is oriented such that the second opening overlies the second integrated layer; and (iv) a seal operable to seal the first and second films to one another such that the electrochemical sensor component is contained within a sensor chamber defined by the first and second films and such that each of the first and second electrical contacts extends to a position outside the sensor chamber.

A sensor in accordance with any other embodiment disclosed herein wherein each of the first and second films has length and width dimensions greater than the first length and first width of the metal-coated membrane.

A sensor in accordance with any other embodiment disclosed herein wherein each of the first and second films comprises a polycarbonate film.

A sensor in accordance with any other embodiment disclosed herein wherein each of the first and second films has a thickness of up to 0.5 mm.

A sensor in accordance with any other embodiment disclosed herein wherein the vent comprises a polytetrafluoroethylene film.

An electrochemical sensor for the detection of analytes comprising a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the nonconductive ion-permeable layer having a third thickness, the nonconductive ion-permeable layer comprising a polymeric material and each of the first and second integrated layers comprising graphene nanoplatelets embedded in the polymeric material, and a sensing layer disposed upon the first integrated layer.

An electrochemical sensor in accordance with any other embodiment disclosed herein wherein a first generally planar boundary lies between the nonconductive ion-permeable layer and the first integrated layer, and wherein a second generally planar boundary lies between the nonconductive ion-permeable layer and the second integrated layer.

An electrochemical sensor in accordance with any other embodiment disclosed herein wherein the sensing layer is disposed over a generally planar surface of the first integrated layer such that the first integrated layer is disposed between the nonconductive ion-permeable layer and the sensing layer, and wherein the sensing layer is configured to generate protons and counter charges in response to select analytes.

An electrochemical sensor in accordance with any other embodiment disclosed herein in which the second integrated layer is configured to complete a proton generating reaction initiated at the sensing layer.

An electrochemical sensor in accordance with any other embodiment disclosed herein in which the nonconductive ion-permeable layer comprises at least one ionomer.

electrochemical sensor in accordance with any other embodiment disclosed herein in which the nonconductive ion-permeable layer comprises a sulfonated tetrafluoroethylene-based polymer.

An electrochemical sensor in accordance with any other embodiment disclosed herein in which the sensing layer has a thickness of from about 50 to about 200 Angstroms.

An electrochemical sensor in accordance with any other embodiment disclosed herein in which the sensing layer includes one or more metal selected from the group consisting of platinum (Pt), tin (Sn), zinc (Zn), ruthenium (Ru), copper (Cu), titanium (Ti), chromium (Cr), gold (Au), silver (Ag), nickel (Ni) and combinations thereof.

An electrochemical sensor in accordance with any other embodiment disclosed herein in which each of the first and second integrated layers has a thickness of from about 5 to about 25 microns.

An electrochemical sensor in accordance with any other embodiment disclosed herein in which each of the first and second subsurface integrated layers includes a conductive nanomaterial selected from the group consisting of graphene, a transition metal dichalcogenide (TMDC), phosphorene, silicone, and combinations thereof.

An electrochemical sensor for the detection of analytes comprising a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the nonconductive ion-permeable layer having a third thickness, the nonconductive ion-permeable layer comprising a polymeric material, the first integrated layer comprising graphene nanoplatelets and metal nanoparticles embedded in the polymeric material, and the second integrated layer comprising graphene nanoplatelets embedded in the polymeric material, and wherein the first integrated layer operates as a sensing layer in the electrochemical sensor and is configured to generate protons and counter charges in response to select analytes.

An electrochemical sensor in accordance with any other embodiment disclosed herein in which the metal nanoparticles comprise one or more metal selected from the group consisting of platinum (Pt), tin (Sn), zinc (Zn), ruthenium (Ru), copper (Cu), titanium (Ti), chromium (Cr), gold (Au), silver (Ag), nickel (Ni) and combinations thereof.

While exemplary embodiments incorporating the principles of the present disclosure have been described herein, the same is to be considered as illustrative and not restrictive in character, it being understood that only the certain embodiments have been shown and described and that all changes, alternatives, modifications and equivalents that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method actions, processes, and operations described herein are not to be construed as necessarily requiring their performance in the particular order discussed or illustrated, unless specifically identified as an order of performance. It is also to be understood that additional or alternative actions or operations may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

What is claimed is:

1. A method for fabricating an electrochemical sensor material, comprising:
   providing a proton exchange membrane having a first surface and an opposing second surface, the proton exchange membrane composed of a polymeric material having a glass transition temperature and having a total membrane thickness;
   positioning a first layer of molded graphene nanoplatelets adjacent the first surface of the proton exchange membrane to provide a multilayer stack;
   applying heat to the proton exchange membrane in an amount sufficient to bring a first region of the proton exchange membrane adjacent the first surface to the glass transition temperature, thereby providing a softened first region;
   applying compressive pressure to the multilayer stack in an amount sufficient to press a first portion of the first layer of graphene nanoplatelets into the softened first region, thereby producing a first integrated layer that includes the first portion of the first layer of graphene nanoplatelets integrated with the polymeric material of the softened first region;
   permitting the polymeric material of the first integrated layer to cool to a temperature below the glass transition temperature; and
   exfoliating a second portion of the first layer of graphene nanoplatelets from the first integrated layer, thereby uncovering the first integrated layer.

2. The method of claim 1 wherein the first integrated layer has a first thickness of from about 9 to about 11 microns.

3. The method of claim 1 wherein the first integrated layer has a first thickness that is from about 5% to about 6% of the total membrane thickness.

4. The method of claim 1 wherein the polymeric material comprises a sulfonated tetrafluoroethylene-based polymer.

5. The method of claim 1 wherein said permitting the polymeric material to cool comprises permitting the polymeric material to cool for at least one hour at standard temperature and pressure in atmosphere before said exfoliating.

6. The method of claim 1 wherein said exfoliating comprises peeling the second portion of the graphene nanoplatelets from the surface.

7. The method of claim 1 wherein said applying heat and applying compressive pressure comprises:
   positioning the multilayer stack between first and second planar members, wherein each of the planar members is composed of a material that is inert with respect to the polymeric material and the molded graphene nanoplatelets, and that has hardness and heat transmission properties effective to transmit heat to the multilayer stack and to transmit pressure to the multilayer stack.

8. The method of claim 7 wherein at least one of said first and second planar members comprises a glass sheet.

9. A method for fabricating an electrochemical sensor material, comprising:
   providing a proton exchange membrane having a first surface and an opposing second surface, the proton exchange membrane composed of a polymeric material having a glass transition temperature and having a total membrane thickness;
   positioning a first layer of molded graphene nanoplatelets adjacent the first surface of the proton exchange membrane and a second layer of molded graphene nanoplatelets adjacent the second surface of the proton exchange membrane to provide a multilayer stack;
   applying heat to the proton exchange membrane in an amount sufficient to bring a first region of the proton exchange membrane adjacent the first surface and a second region of the proton exchange membrane adjacent the second surface to the glass transition temperature, thereby providing a softened first region adjacent the first surface and a softened second region adjacent the second surface;

applying compressive pressure to the multilayer stack in an amount sufficient to press a first portion of the first layer of graphene nanoplatelets into the softened first region, thereby producing a first integrated layer that includes the first portion of the first layer of graphene nanoplatelets integrated with the polymeric material of the softened first region and to press a first portion of the second layer of graphene nanoplatelets into the softened second region, thereby producing a second integrated layer that includes the first portion of the second layer of graphene nanoplatelets integrated with the polymeric material of the softened second region;

permitting the polymeric material of the first integrated layer and the polymeric material of the second integrated layer to cool to a temperature below the glass transition temperature;

exfoliating a second portion of the first layer of molded graphene nanoplatelets from the first integrated layer, thereby uncovering the first integrated layer; and exfoliating a second portion of the second layer of molded graphene nanoplatelets from the second integrated layer thereby uncovering the second integrated layer.

10. The method of claim 9, further comprising:
depositing a metal layer over the first integrated layer to provide a metal-coated membrane; and
cutting the metal-coated membrane to provide a sized metal-coated membrane having a first length and a first width.

11. The method of claim 10, further comprising affixing a first electrical contact to the metal layer in electrical communication with the metal layer and affixing a second electrical contact to the second integrated layer in electrical communication with the second integrated layer to provide an electrochemical sensor component.

12. The method of claim 9 wherein the first integrated layer comprises graphene nanoplatelets and metal nanoparticles embedded in the polymeric material.

13. The method of claim 12, further comprising affixing a first electrical contact to the first integrated layer in electrical communication with the first integrated layer and affixing a second electrical contact to the second integrated layer in electrical communication with the second integrated layer to provide an electrochemical sensor component.

14. A method for fabricating an electrochemical sensor component, comprising:
providing a multilayer proton exchange membrane comprising a plurality of layers, the plurality of layers including a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the multilayer proton exchange membrane having a total membrane thickness, the first integrated layer having a first thickness, the second integrated layer having a second thickness and the nonconductive ion-permeable layer having a third thickness, the nonconductive ion-permeable layer comprising a polymeric material and each of the first and second integrated layers comprising graphene nanoplatelets embedded in the polymeric material wherein the multilayer proton exchange membrane comprises a metal layer deposited over the first integrated layer to provide a metal-coated membrane; and;

cutting the metal-coated membrane to provide a sized metal-coated membrane having a first length and a first width;

wherein said cutting comprises orienting a cutting edge of a cutting tool across the full thickness of the metal-coated membrane, wherein the cutting edge contacts and cuts through the layers of the metal-coated membrane simultaneously, and wherein the relative movement between the cutting edge and the metal-coated membrane causes the cutting edge to pass through the metal-coated membrane in a direction substantially parallel to a plane in which the metal-coated membrane lies.

15. The method of claim 14 wherein the cutting edge of the cutting tool lies substantially perpendicular to the plane in which the metal-coated membrane lies.

16. The method of claim 14 wherein the cutting tool is a fixed-position cutting tool and wherein said cutting comprises pulling the metal-coated membrane against the fixed-position cutting tool.

17. The method of claim 16 wherein said pulling comprises:
compressing first and second sections of a leading edge of the metal-coated membrane between first and second clamps positioned on opposite sides of a desired cut line; and
applying a pull tension to the metal-coated membrane in a first direction toward the cutting tool by exerting a pulling force on the first and second clamps in the first direction.

18. The method of claim 14 wherein said cutting tool comprises a stationary cutting blade.

19. The method of claim 14, further comprising, after said cutting, exposing the sized metal-coated membrane to an elevated singe temperature to remove any chads present at a cut edge of the sized metal-coated membrane as a result of said cutting.

20. The method of claim 19 wherein the elevated singe temperature is a temperature of from about 320 to about 380° F.

21. The method of claim 14, further comprising affixing a first electrical contact in electrical communication with the metal layer and a second electrical contact in electrical communication with the second integrated layer to provide an electrochemical sensor component.

22. The method of claim 14 wherein the polymeric material comprises a sulfonated tetrafluoroethylene-based polymer.

23. The method of claim 14 wherein the total membrane thickness is from about 160 to about 200 microns.

24. The method of claim 14 wherein the metal layer has a thickness of from about 50 to about 200 Angstroms (Å).

25. The method of claim 14 wherein the first thickness is from about 9 to about 11 microns and the second thickness is from about 9 to about 11 microns.

26. The method of claim 25 wherein each of the first thickness and the second thickness is from about 5% to about 6% of the total membrane thickness.

27. The method of claim 14, further comprising enclosing the electrochemical sensor component within an enclosure that is operable to permit a gaseous analyte to contact the metal layer.

28. The method of claim 27 wherein said enclosing comprises:
providing a first film defining a first opening therethrough, the first film composed of a material that is water-impervious and vapor-impervious;

attaching a vent to the first film in a manner whereby the vent sealingly covers the first opening, the vent composed of a material that is water-impervious but that permits flow of a gaseous analyte therethrough;

orienting the electrochemical sensor component with the first film adjacent the metal layer such that the first opening and the vent overlie the metal layer;

providing a second film defining a second opening therethrough, the second film composed of a material that is water-impervious and vapor-impervious;

orienting the electrochemical sensor component with the second film adjacent the second integrated layer such that the second opening overlies the second integrated layer; and sealing the first and second films to one another such that the metal-coated membrane is contained within a sensor chamber defined by the first and second films.

29. The method of claim 28, further comprising affixing a first electrical contact in electrical communication with the metal layer and a second electrical contact in electrical communication with the second integrated layer, such that the first and second electrical contacts extend to a position outside the sensor chamber; and connecting a detection module to said first and second contacts.

30. An electrochemical sensor component, comprising:
a multilayer proton exchange membrane comprising a first integrated layer at a first surface of the multilayer proton exchange membrane and a second integrated layer at a second surface of the multilayer proton exchange membrane, wherein a portion of the proton exchange membrane positioned between the first and second integrated layers comprises a nonconductive ion-permeable layer, the multilayer proton exchange membrane having a total membrane thickness, the first integrated layer having a first thickness, the second integrated layer having a second thickness and the nonconductive ion-permeable layer having a third thickness, the nonconductive ion-permeable layer comprising a polymeric material and each of the first and second integrated layers comprising graphene nanoplatelets embedded in the polymeric material;
a metal layer positioned over the first integrated layer;
a first electrical contact affixed to the metal layer in electrical communication with the metal layer; and
a second electrical contact affixed to the second integrated layer in electrical communication with the second integrated layer.

31. An electrochemical sensor comprising the electrochemical sensor component of claim 30 and a detection module electrically connected to said first and second contacts.

32. The electrochemical sensor of claim 31, further comprising a containment system operable to permit a gaseous analyte in the environment of the sensor to contact the metal layer and operable to prevent liquids and contaminants from contacting the electrochemical sensor component.

33. The electrochemical sensor of claim 32 wherein the containment system comprises:
a first film defining a first opening therethrough, the first film composed of a material that is water-impervious and vapor-impervious;
a vent attached to the first film in a manner whereby the vent sealingly covers the first opening, the vent composed of a material that is water-impervious but that permits flow of a gaseous analyte therethrough, wherein the first film is oriented such that the first opening and the vent overlie the metal layer;
a second film defining a second opening therethrough, the second film composed of a material that is water-impervious and vapor-impervious, wherein the second film is oriented such that the second opening overlies the second integrated layer; and
a seal operable to seal the first and second films to one another such that the electrochemical sensor component is contained within a sensor chamber defined by the first and second films and such that each of the first and second electrical contacts extends to a position outside the sensor chamber.

34. The sensor of claim 33 wherein each of the first and second films comprises a polycarbonate film.

* * * * *